(12) United States Patent
Dabby et al.

(10) Patent No.: US 11,551,551 B2
(45) Date of Patent: Jan. 10, 2023

(54) TECHNOLOGIES FOR PROVIDING GUIDANCE FOR AUTONOMOUS VEHICLES IN AREAS OF LOW NETWORK CONNECTIVITY

(71) Applicant: Intel Corporation, Santa Clara, CA (US)

(72) Inventors: Nadine Dabby, Palo Alto, CA (US); Johanna Swan, Scottsdale, AZ (US); Annie Foong, Aloha, OR (US); Karla Saur, Portland, OR (US); Hassnaa Moustafa, Portland, OR (US); Rita H. Wouhaybi, Portland, OR (US); Linda Hurd, Cool, CA (US); Rajashree Baskaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 16/233,922

(22) Filed: Dec. 27, 2018

(65) Prior Publication Data
US 2019/0130743 A1    May 2, 2019

(51) Int. Cl.
*G08G 1/0968*    (2006.01)
*H04W 4/44*    (2018.01)
(Continued)

(52) U.S. Cl.
CPC ....... *G08G 1/096811* (2013.01); *G01C 21/28* (2013.01); *G01C 21/34* (2013.01);
(Continued)

(58) Field of Classification Search
CPC .............................. H04W 4/46; H04W 4/024
See application file for complete search history.

(56) References Cited

U.S. PATENT DOCUMENTS

| 9,881,506 B1 | 1/2018 | Gentry |
| 2008/0095134 A1* | 4/2008 | Chen .................... H04W 40/32 370/342 |

(Continued)

FOREIGN PATENT DOCUMENTS

| JP | 2005037168 A | 2/2005 |
| KR | 1020180081266 A | 7/2018 |

OTHER PUBLICATIONS

PCT International Search Report and Written Opinion issued in PCT/US2019/061957, dated Mar. 20, 2020; 11 pages.

(Continued)

*Primary Examiner* — Jeff A Burke
*Assistant Examiner* — Madison B Emmett
(74) *Attorney, Agent, or Firm* — Alliance IP, LLC

(57) ABSTRACT

Techniques are disclosed herein for providing guidance for autonomous vehicles in areas of low network connectivity, such as rural areas. According to an embodiment, a guidance system receives a request to exchange data with a vehicle within a specified radius thereof over a wireless connection (e.g., a radio frequency protocol-based connection). The data is stored by the guidance system and is indicative of navigation information within the specified radius. The guidance system transmits the stored data to the vehicle. The guidance system also receives, from the vehicle, data indicative of navigation information for a path previously passed by the vehicle.

24 Claims, 10 Drawing Sheets

(51) Int. Cl.

| | |
|---|---|
| *G01C 21/34* | (2006.01) |
| *G01C 21/28* | (2006.01) |
| *G08G 1/0962* | (2006.01) |
| *G08G 1/0965* | (2006.01) |
| *G08G 1/0967* | (2006.01) |
| *H04W 4/024* | (2018.01) |
| *G08G 1/09* | (2006.01) |
| *G05D 1/00* | (2006.01) |

(52) U.S. Cl.
CPC ....... *G08G 1/0965* (2013.01); *G08G 1/09623* (2013.01); *G08G 1/09626* (2013.01); *G08G 1/096791* (2013.01); *H04W 4/024* (2018.02); *H04W 4/44* (2018.02); *G05D 1/0088* (2013.01); *G05D 2201/0213* (2013.01); *G08G 1/091* (2013.01)

(56) References Cited

U.S. PATENT DOCUMENTS

| | | | |
|---|---|---|---|
| 2017/0219369 A1* | 8/2017 | Lei | .................. G08G 1/096716 |
| 2017/0251486 A1* | 8/2017 | Hu | .................... H04W 72/0406 |
| 2017/0331836 A1* | 11/2017 | De Souza Schwartz | .................... H04L 63/123 |
| 2018/0005525 A1* | 1/2018 | Parundekar | ............. H04L 67/12 |
| 2018/0053405 A1 | 2/2018 | Azevedo et al. | |
| 2018/0143631 A1 | 5/2018 | Myers et al. | |
| 2019/0130743 A1 | 5/2019 | Dabby et al. | |
| 2020/0145875 A1* | 5/2020 | Higuchi | .................. H04L 47/14 |

OTHER PUBLICATIONS

EPO; Extended European Search Report issued in EP Patent Application No. 19902708.7, dated Sep. 8, 2022; 6 pages.

* cited by examiner

TECHNOLOGIES FOR PROVIDING GUIDANCE FOR AUTONOMOUS VEHICLES IN AREAS OF LOW NETWORK CONNECTIVITY

BACKGROUND

An autonomous vehicle is a vehicle that is capable of sensing a surrounding environment and navigating through the environment to reach a predetermined destination, typically without further input from a vehicle operator. To do so, the autonomous vehicle may include various sensors, such as lasers, radar, global positioning system (GPS), and computer vision technologies. A vehicle control system configured with the autonomous vehicle may process sensor data to identify appropriate navigation paths, obstacles, and relevant signage.

The vehicle control system may rely on communications with a remote navigation service (e.g., executing by a cloud service provider) or other vehicles (e.g., via vehicle-to-vehicle (V2V) communications over a 5G or dedicated short-range communications (DSRC) channel) to safely navigate through an area. For example, the vehicle control system may receive up-to-date information from the navigation service regarding conditions of upcoming road segments reported by other vehicles (e.g., traffic conditions, signage, road closures, safety hazards, and the like). However, such communications often require that the autonomous vehicle is connected with a network, such as the Internet or a cellular network. In some cases, an autonomous vehicle may traverse through an area having limited network coverage, such as rural areas. Thus, the autonomous vehicle might not be able to communicate with a remote navigation service or other vehicles. Instead, the autonomous vehicle navigates through the area using predefined map data (which might not be up-to-date) relative to data obtained from on-board sensors of the vehicle control system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
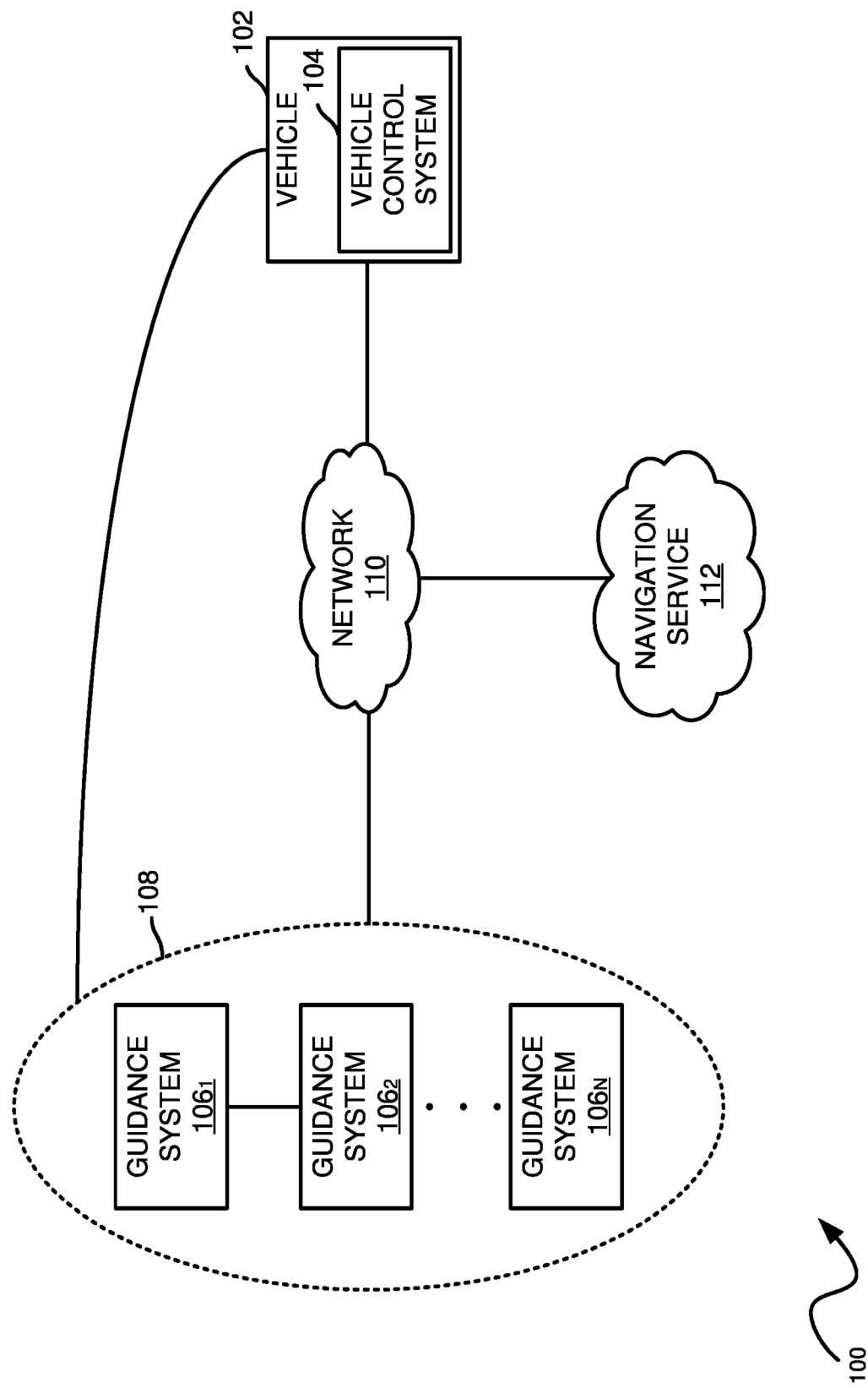
FIG. 1 is a simplified block diagram of an example computing environment in which autonomous vehicles communicate with guidance systems in an area of low network connectivity.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing environment 100 includes a vehicle 102, which exchanges navigation information with one or more guidance systems 106. In the illustrative embodiment, the vehicle 102 may be embodied as any type of autonomous or "driver-less" vehicle capable of transporting passengers. Further, in the embodiments described herein, the vehicles 102 need not be fully autonomous, as one of skill in the art will recognize that the techniques of the present disclosure may also be adapted to partially autonomous vehicles.

As shown, the vehicle 102 includes a vehicle control system 104. The vehicle control system 104 provides decision-making and control logic to cause the vehicle to operate in an autonomous manner with little to no input from a human operator. For example, a given vehicle control system 104 may obtain data from a variety of sensors within a vehicle 102 to determine a visible road geometry, objects (e.g., road signage, traffic posts, pedestrians, other vehicles, etc.) in view of one or more of the sensors, distance from such objects, and so on. Based, in part, on the obtained sensor data, the vehicle control system 104 may determine actions to perform in operation, such as whether to maintain, increase, or reduce speed, change lanes, stop the vehicle, and so on.

Further, in an embodiment, the vehicle control system 104 may communicate, via a network 110 (e.g., the Internet), with a navigation service 112, e.g., that executes on a cloud network. The navigation service 112 may transmit relatively up-to-date navigation information (e.g., road conditions, traffic and congestion data, road signage, public safety warnings, navigation information sent by other vehicles, and the like) to the vehicle control system 104. The vehicle control system 104 may apply the navigation information to various components therein. For example, the vehicle control system 104 may determine, based on navigation information received from the navigation service 112, that traffic towards a specified destination is relatively congested on a given path, and control logic in the vehicle control system 104 may determine a less congested path to the destination. As another example, the vehicle control system 104 may determine, based on the navigation information, that a bridge on a current path to the destination is out-of-service, and in response, identify an alternate route.

Further still, in an embodiment, the vehicle control system 104 may communicate with other vehicles within proximity of the vehicle 102, e.g., over a vehicular communications systems network. Such communications may include, for example, vehicle-to-vehicle (V2V) messages over a given frequency. The communications between vehicles may include safety warnings, traffic information, and lane change indications to prevent accidents and traffic congestion.

As stated, the vehicle control system 104 may communicate with the navigation service 112 and other vehicles via a network, such as by the network 110. However, in some cases, the vehicle 102 might operate in an area in which network connectivity is relatively low, preventing the vehicle control system 104 to access the navigation service 112. Further, such areas may be sparsely populated, and the vehicle 102 might not come within proximity of another vehicle along the path with which to send or receive communications. For example, rural areas and deserts may be areas in which network connectivity is low and/or with relatively low traffic. As a result, in some cases, the vehicle control system 104 may rely on existing data (e.g., map data that is preloaded into the vehicle control system 104) to navigate through the areas.

Embodiments of the present disclosure provide techniques for navigating through areas of low network connectivity, e.g., in rural areas, by an autonomous vehicle. In an embodiment, an area of low network connectivity may have a number of guidance systems $106_{1-N}$ installed. For example, a guidance system 106 may be situated at various points alongside a road path. For instance, for a continuous path, a guidance system 106 may be situated at predetermined intervals (e.g., every one mile, five miles, fifty miles, etc., as needed).

In an embodiment, each guidance system 106 stores navigation information for a road segment associated therewith. Passing vehicles (e.g., the vehicle 102) may update the navigation information based on observed data sent to the guidance system 106. Further, the guidance systems $106_{1-N}$ may form a network 108 of guidance systems that are not necessarily interconnected with one another but can be updated with information regarding one another by vehicles traversing an area covered by the network 108. Of course, one of skill in the art will recognize that guidance systems $106_{1-N}$ may be interconnected with one another and to other components of the computing environment 100 via the network 110.

Similar to a cairn, e.g., a pile of stones that is heaped up at a landmark by travelers to notify subsequent travelers of a path at that landmark, the guidance system 106 provides the navigation information to the passing vehicles. As further described herein, to do so, the vehicle control system 104, when in proximity with a guidance system 106, may receive the stored navigation information from the guidance system 106 via a wireless connection, e.g., via a radio-frequency based standard protocol such as Bluetooth. Advantageously, such a wireless connection does not require connectivity with the network 110 and allows the vehicle to communicate back and forth with a given guidance system 106 while in proximity. In addition, the vehicle control system 104 can send navigation information relating to the most previously traversed area (e.g., since the last guidance system 106 in the network 108 encountered by the vehicle control system 104).

Figure 2:
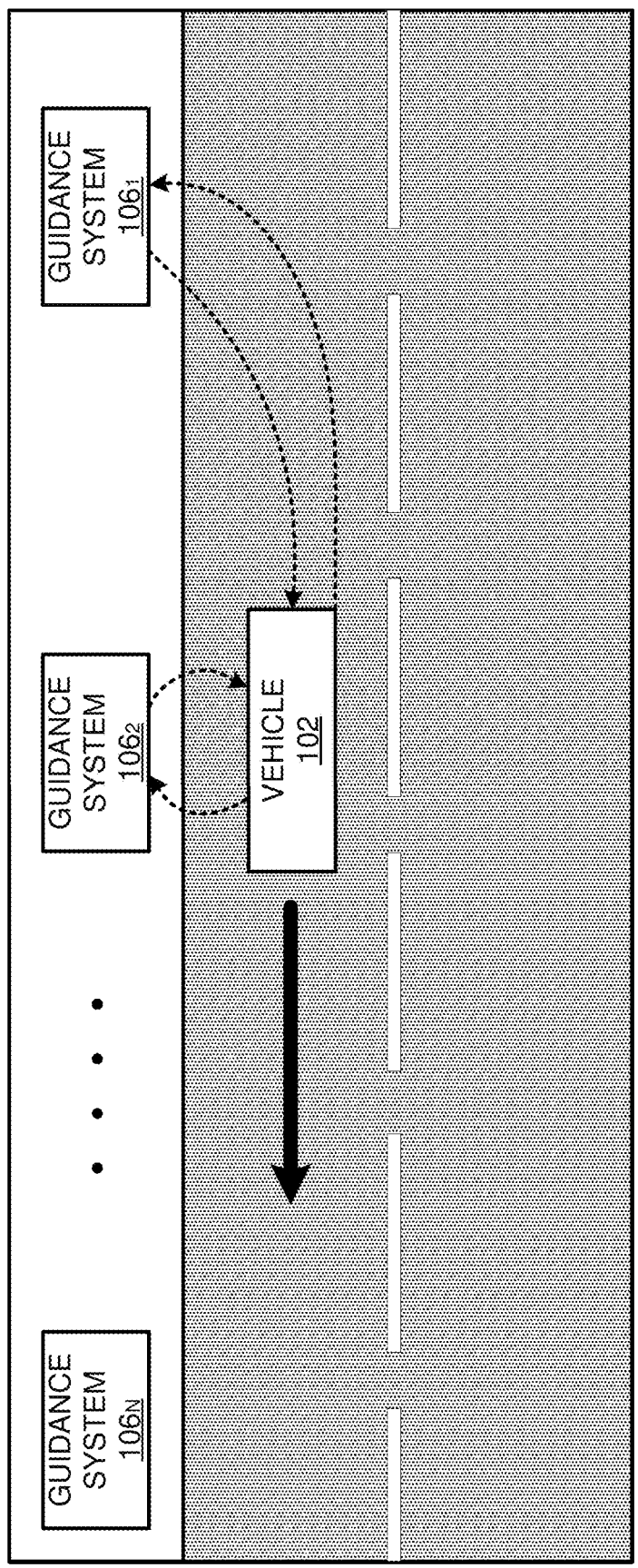
FIG. 2 is a simplified conceptual diagram of at least one embodiment of autonomous vehicle exchanging data with one or more guidance systems of FIG. 1 in an area of low network connectivity.

For example, referring now to FIG. 2, a conceptual diagram of the vehicle 102 interacting with the guidance systems $106_{1-N}$ is shown. Illustratively, the vehicle 102 is moving across a two lane road in a given direction. In an embodiment, each of the guidance systems $106_{1-N}$ may broadcast a wireless signal at a predefined interval. The wireless signal is indicative of an availability of a given guidance system 106 to provide and receive navigational data. A vehicle 102 may receive the broadcast and, in response, send a request for navigation information from the guidance system 106. Further, in other embodiments, known guidance systems 106 may be predefined in map data of the vehicle control system 104. The vehicle control system 104 may transmit a discovery request to the guidance system $106_{1-N}$ when coming into proximity of a known guidance system 106. Advantageously, this approach requires less energy expenditure by the guidance system 106 because the guidance system 106 does not need to broadcast wireless signals at a given rate.

Illustratively, in FIG. 2, when the vehicle 102 is within proximity of the guidance system $106_1$, such as a predefined radius of the guidance system $106_1$ the vehicle 102 initiates a connection with the guidance system $106_1$, e.g., via a RF-based standard protocol, such as Bluetooth. Once connected, the guidance system $106_1$ sends navigation information to the vehicle 102 for the road segment associated with the guidance system $106_1$ (e.g., the surrounding area of the guidance system $106_1$), as indicated by the one-way arrow connecting the vehicle 102 towards the guidance system $106_1$. Such navigation information may include road conditions, signage, discovery of risk areas (e.g., potholes, animal crossings, areas having a relatively high amount of pedestrians or cyclists, etc.), nearest charging areas or gas stations, weather or geological alerts, and the like.

In addition, the vehicle 102 (e.g., via the vehicle control system 104) sends navigation information relating to the guidance system $106_1$, as depicted by the one-way arrow connecting the vehicle 102 toward the guidance system $106_1$. For example, the vehicle 102 may send navigation information relating to a previous road segment traveled, in which the types of navigation information are similar to that described above. In addition, the vehicle 102 may also send information provided to the vehicle 102 by the navigation service 112 for the area covered by the guidance system $106_1$. For example, the navigation service 112 may push community alerts (e.g., weather alerts, missing child alerts, etc.) to the vehicle 102 prior to the vehicle 102 entering the area. The vehicle 102, once in proximity of the guidance system $106_1$, may transmit such alerts. The guidance system $106_1$ may update its stored data based on the information sent by the vehicle 102.

Illustratively, the vehicle 102 also passes through an area covered by the guidance system $106_2$. The vehicle 102 may connect with the guidance system $106_2$ in a similar manner as the connection with guidance system $106_1$. Further, the vehicle 102 may receive navigation information from the guidance system $106_2$ in a similar manner, as well. Further still, the vehicle 102 may send information to the guidance system $106_2$ relating to the previous road segment traveled. In an embodiment, the information may be navigation information gathered by the vehicle control system 104 since passing the guidance system $106_1$.

Figure 3:
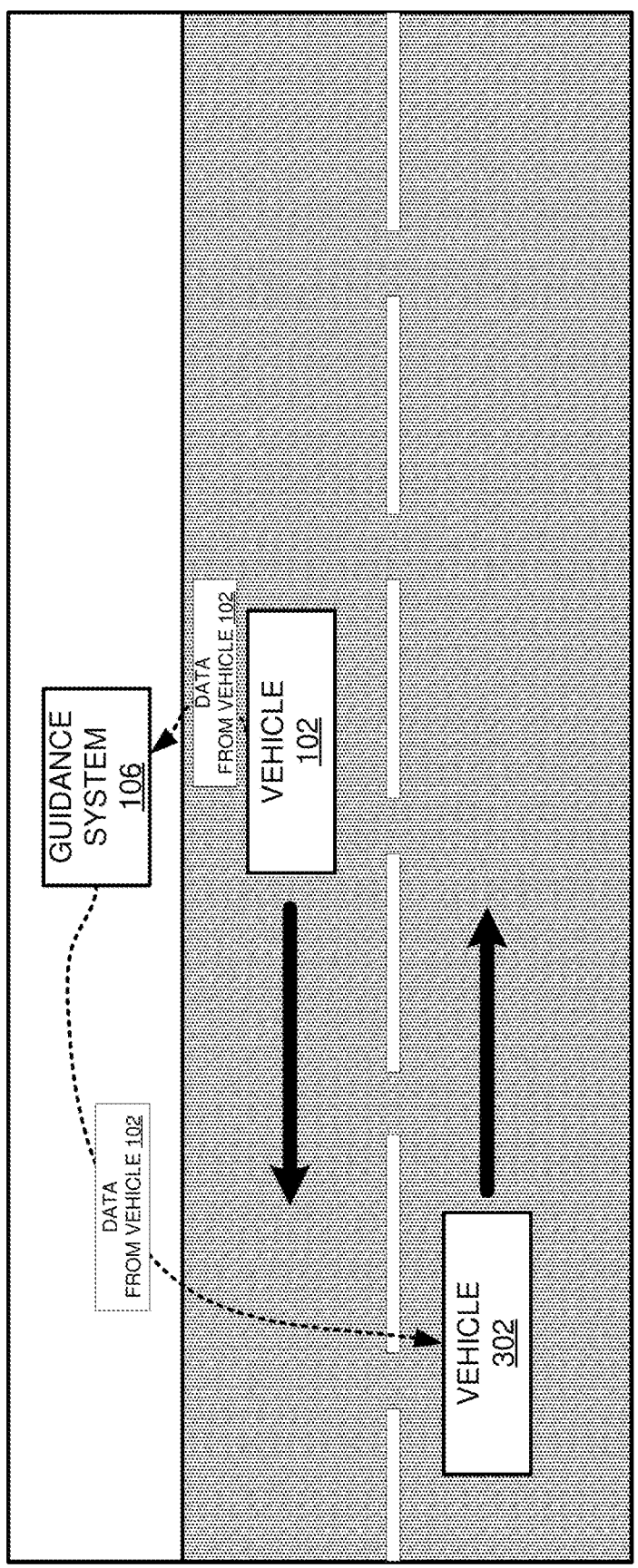
FIG. 3 is a simplified conceptual diagram of at least one embodiment of an exchange of data indicative of road conditions by one autonomous vehicle to another autonomous vehicle via the guidance system of FIG. 1.

As stated, the guidance systems $106_{1-N}$ provide passing vehicles with navigation information for the area associated with the given guidance system 106. Referring now to FIG. 3, an example of navigation information is updated and exchanged between vehicles (e.g., vehicles 102 and 302) via a given guidance system 106 is shown. In this example, a guidance system 106 is situated alongside a two-lane road. Further, in this example, assume that the vehicle 102 moves past the guidance system 106 prior to the vehicle 302 reaching the guidance system 106. As shown, the vehicle 102 transmits data including navigation information to the guidance system 106, as indicated by the one-way arrow from the vehicle 102 to the guidance system 106. The navigation information may be data observed by the vehicle 102 for the previous road segment.

Continuing the example, assume that the vehicle 302 is the next vehicle to approach the guidance system 106. Further, the vehicle 302 approaches the guidance system 106 at a later point in time (e.g., immediately after the vehicle 102 passes by, an hour after, a day after, a week after, etc.). Further assume that the vehicle 302 is moving in the opposite direction of the vehicle 102. The guidance system 106 transmits the data sent by the vehicle 102 to the vehicle 302, as indicated by the one-way arrow connecting from the guidance system 106 to the vehicle 302. As a result, the vehicle 302 has navigation information for an upcoming area covered by the guidance system 106.

In some embodiments, vehicles may transmit data addressed to a particular vehicle via the guidance system 106. For example, the vehicle 102 may, as part of the data sent to the guidance system 106, include a formatted message including an identifier associated with a target vehicle, e.g., vehicle 302. In turn, the guidance system 106, when exchanging data with the vehicle 302, may also evaluate an identifier associated with the vehicle 302 to determine whether any message data is present for the vehicle 302. If so found, the guidance system 106 may transmit the message to the vehicle 302 (e.g., the message transmitted by the vehicle 102).

Figure 4:
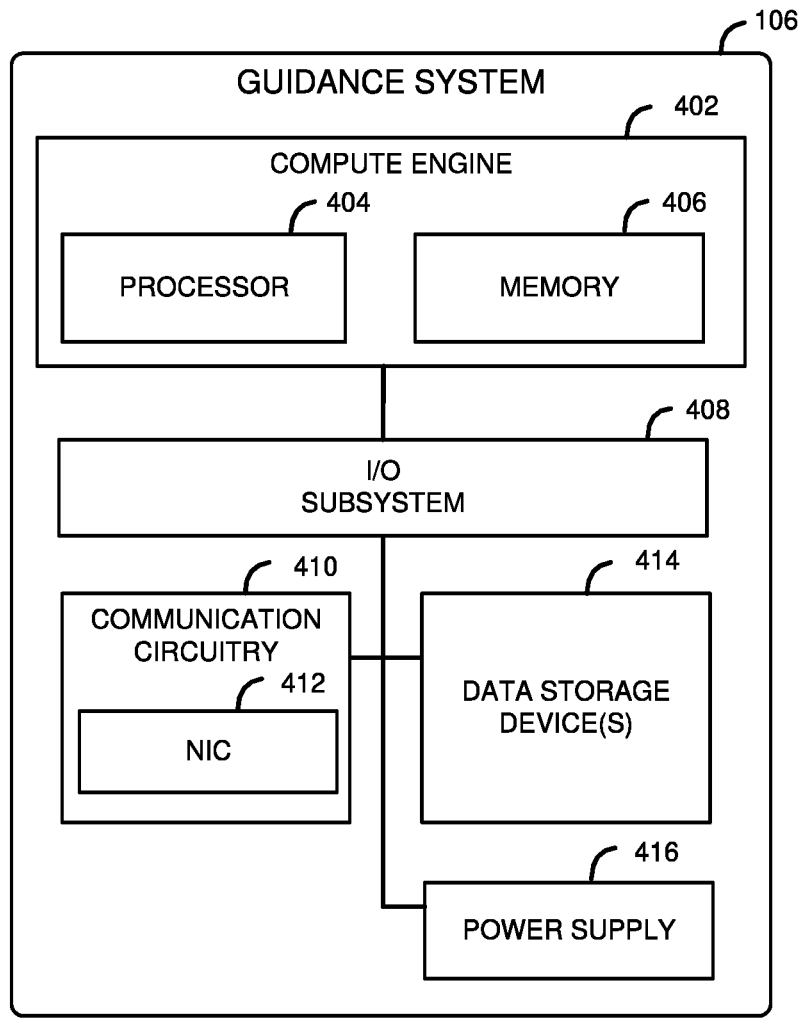
FIG. 4 is a simplified block diagram of at least one embodiment of an example guidance system described relative to FIG. 1.

Referring now to FIG. 4, the guidance system 106 may be embodied as any type of device performing the functions described herein, such as storing data indicative of navigation information (e.g., road conditions, signage, traffic updates, safety hazards, and the like), establishing a connection with an autonomous vehicle within a specified radius of the guidance system 106, and exchanging the data with the autonomous vehicle.

As shown, the illustrative guidance system 106 includes a compute circuitry 402, an input/output (I/O) subsystem 408, communication circuitry 410, data storage devices 414, and power supply 416. Of course, in other embodiments, the guidance system 106 may include other or additional components, such as those commonly found in a computer (e.g., display, peripheral devices, etc.). Additionally, in some embodiments, one or more of the illustrative components may be incorporated in, or otherwise form a portion of, another component.

The compute circuitry 402 may be embodied as any type of device or collection of devices capable of performing various compute functions described below. In some embodiments, the compute circuitry 402 may be embodied as a single device such as an integrated circuit, an embedded system, a field programmable gate array (FPGA), a system-on-a-chip (SOC), or other integrated system or device. Additionally, in some embodiments, the compute circuitry 402 includes or is embodied as a processor 404 and a memory 406. The processor 404 may be embodied as one or more processors, each processor being a type capable of performing the functions described herein. For example, the processor 404 may be embodied as a single or multi-core processor(s), a microcontroller, or other processor or processing/controlling circuit. In some embodiments, the processor 404 may be embodied as, include, or be coupled to an FPGA, an ASIC, reconfigurable hardware or hardware circuitry, or other specialized hardware to facilitate performance of the functions described herein.

The memory 406 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 406 may be integrated into the processor 404.

The compute circuitry 402 is communicatively coupled with other components of the guidance system 106 via the I/O subsystem 408, which may be embodied as circuitry and/or components to facilitate input/output operations with the compute circuitry 402 (e.g., with the processor 404 and/or the memory 406) and other components of the guidance system 106. For example, the I/O subsystem 408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 408 may form a portion of a system-on-a-chip (SoC) and be incorporated, along with one or more of the processor 404, the memory 406, and other components of the guidance system 106, into the compute circuitry 402.

The communication circuitry 410 may be embodied as any communication circuit, device, or collection thereof, capable of enabling communications over a network between the guidance system 106 and other devices (e.g., the vehicle control system 104 of vehicle 102). The communication circuitry 410 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication.

The illustrative communication circuitry 410 includes a network interface controller (NIC) 412, which may also be referred to as a host fabric interface (HFI). The NIC 412 may be embodied as one or more add-in-boards, daughtercards, controller chips, chipsets, or other devices that may be used by the guidance system 106 for network communications with remote devices. For example, the NIC 412 may be embodied as an expansion card coupled to the I/O subsystem 408 over an expansion bus such as PCI Express.

The one or more illustrative data storage devices 414 may be embodied as any type of devices configured for short-term or long-term storage of data such as, for example, memory devices and circuits, memory cards, hard disk drives (HDDs), solid-state drives (SSDs), or other data storage devices. Each data storage device 414 may include a system partition that stores data and firmware code for the data storage device 414. Each data storage device 414 may also include an operating system partition that stores data files and executables for an operating system.

The illustrative power supply 416 may be embodied as any type of hardware or circuitry configured to power an onboard generator of the guidance system 106 to allow operation of the hardware components thereof. For example, the power supply 416 may include components to receive solar, wind power, or other types of power derived from natural resources. Including such a power supply 416 may be advantageous in areas that may be outside of coverage provided by of an electrical grid and thus allow the guidance system 106 to continuously exchange data with passing autonomous vehicles. Of course, the power supply 416 may also include components for receiving electric power.

Additionally or alternatively, the guidance system 106 may include one or more peripheral devices. Such peripheral devices may include any type of peripheral device commonly found in a compute device such as a display, speakers, a mouse, a keyboard, and/or other input/output devices, interface devices, and/or other peripheral devices. Further, the guidance system 106 may include a number of sensors, which may be embodied as any hardware or circuitry to observe internal or external conditions and provide data to the guidance system 106. For example, the guidance system 106 can include any number of radars, global positioning systems (GPS), thermal sensors, motion sensors, and the like.

Further, as described above, the guidance system 106 is illustratively in communication via the network 110, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 5:
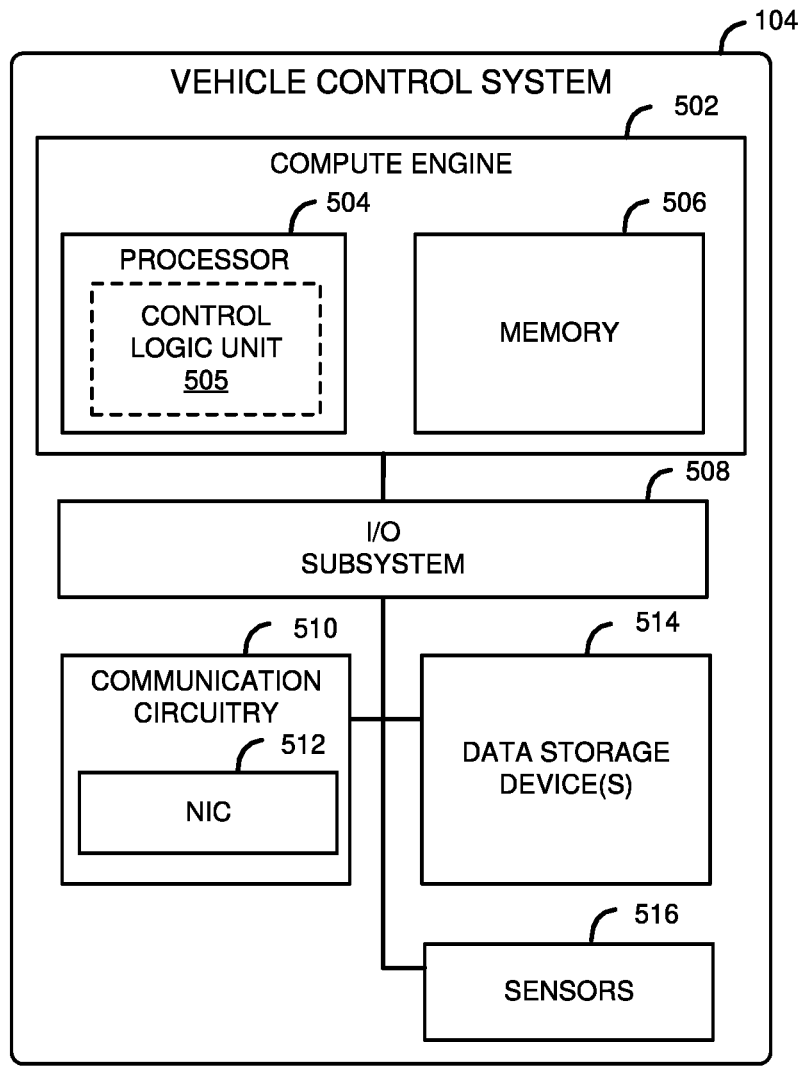
FIG. 5 is a simplified block diagram of at least one embodiment of an example vehicle control system described relative to FIG. 1.

Referring now to FIG. 5, the vehicle control system 104 may be embodied as any type of device performing the functions described herein, such as detecting a presence of a guidance system 106 along a road segment, requesting navigational information from the guidance system 106, receiving the navigational information from the guidance system, and updating an on-board navigation data with the received information.

As shown, the illustrative vehicle control system 104 includes a compute circuitry 502, an input/output (I/O) subsystem 508, communication circuitry 510, data storage devices 514, and sensors 516. Of course, in other embodiments, the vehicle control system 104 may include other or additional components, such as those commonly found in a computer (e.g., display, peripheral devices, etc.). Additionally, in some embodiments, one or more of the illustrative components may be incorporated in, or otherwise form a portion of, another component.

The compute circuitry 502 may be embodied as any type of device or collection of devices capable of performing various compute functions described below. In some embodiments, the compute circuitry 502 may be embodied as a single device such as an integrated circuit, an embedded system, a field programmable gate array (FPGA), a system-on-a-chip (SOC), or other integrated system or device. Additionally, in some embodiments, the compute circuitry 502 includes or is embodied as a processor 504 and a memory 506. The processor 504 may be embodied as one or more processors, each processor being a type capable of performing the functions described herein. The processor 504 may be similar to that described relative to the processor 404.

In the illustrative embodiment, the processor 504 includes a control logic unit 505, which may be embodied as any type of hardware (e.g., a co-processor, an integrated circuit, etc.) or software used to determine and carry out courses of action for the vehicle 102 (e.g., on which the vehicle control system 104 is configured). The control logic unit 505 may communicate with one or more of the sensors 516 via the I/O subsystem 508 to retrieve data regarding operation of the vehicle 102.

The memory 506 may be embodied as any type of volatile (e.g., dynamic random access memory, etc.) or non-volatile memory (e.g., byte addressable memory) or data storage capable of performing the functions described herein. The memory 506 may be embodied similar to that described relative to the memory 406. In some embodiments, all or a portion of the memory 506 may be integrated into the processor 504.

The compute circuitry 502 is communicatively coupled with other components of the vehicle control system 104 via the I/O subsystem 508, which may be embodied as circuitry and/or components to facilitate input/output operations with the compute circuitry 502 (e.g., with the processor 504 and/or the memory 506) and other components of the vehicle control system 104. For example, the I/O subsystem 208 may be embodied similar to that described relative to the I/O subsystem 408. In some embodiments, the I/O subsystem 508 may form a portion of a system-on-a-chip (SoC) and be incorporated, along with one or more of the processor 504, the memory 506, and other components of the vehicle control system 104, into the compute circuitry 502.

The communication circuitry 510 may be embodied as any communication circuit, device, or collection thereof, capable of enabling communications over a network between the vehicle control system 104 and other devices (e.g., vehicle control systems 104 in other vehicles 102), similar to that of the communication circuitry 410. The illustrative communication circuitry 510 includes a network interface controller (NIC) 512, similar to that of the NIC 412. The one or more illustrative data storage devices 514 may be embodied as any type of devices configured for short-term or long-term storage of data similar to that described relative to data storage devices 414.

The one or more illustrative sensors 516 may be embodied as any type of devices configured to provide data regarding the surroundings and interior of the vehicle 102 so that logic in the vehicle control system 104 (e.g., the control logic unit 505) may carry out actions responsive to the data (e.g., whether to accelerate the vehicle 102 or come to a stop). For example, the sensors 516 can include a global positioning system (GPS), cameras, radar, lasers, speedometers, angular rate sensors, computer vision sensors, and so on. The sensors 516 may communicate data to the control logic unit 505 (or any other component within the vehicle control system 104) via the I/O subsystem 508.

Additionally or alternatively, the vehicle control system 104 may include one or more peripheral devices. Such peripheral devices may include any type of peripheral device commonly found in a compute device such as a display, speakers, a mouse, a keyboard, and/or other input/output devices, interface devices, and/or other peripheral devices.

Figure 6:
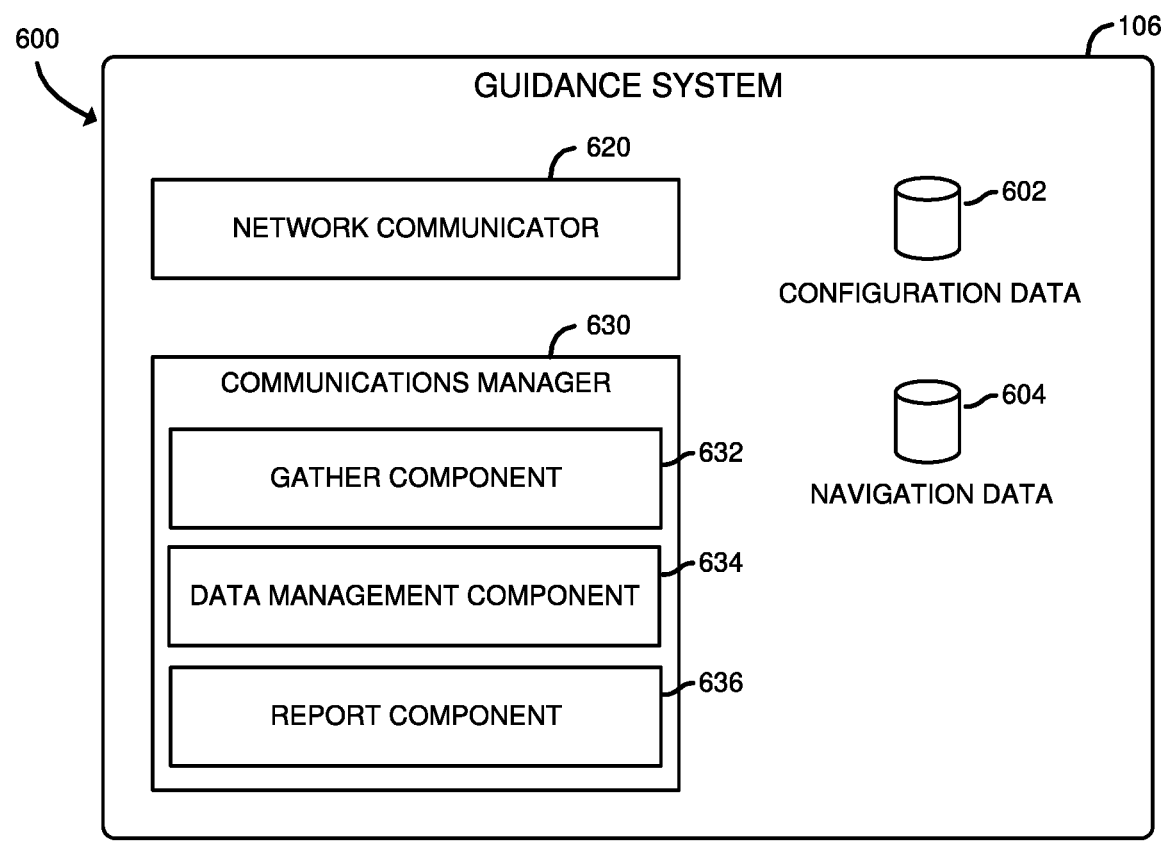
FIG. 6 is a simplified block diagram of at least one embodiment of an environment that may be established by the guidance system of FIG. 1.

Referring now to FIG. 6, each guidance system 106 may establish an environment 600 in operation. The illustrative environment 600 includes a network communicator 620 and a communications manager 630. Each of the components of the environment 600 may be embodied as hardware, firmware, software, or a combination thereof. Further, in some embodiments, one or more of the components of the environment 600 may be embodied as circuitry or a collection of electrical devices (e.g., network communicator circuitry 620, communications manager circuitry 630, etc.). It should be appreciated that, in such embodiments, one or more of the network communicator circuitry 620 and communication manager circuitry 630 may form a portion of one or more of the NIC 412, compute circuitry 402, the communication circuitry 410, the I/O subsystem 408, data storage devices 414, power supply 416, and/or other components of the guidance system 106.

In the illustrative embodiment, the environment 600 includes configuration data 602, which may be embodied as any data relating to configuration parameters for the guidance system 106. Configuration data 602 may include a frequency at which the guidance system 106 broadcasts availability. Further, configuration data 602 may include a radius size indicative of the area coverage of the guidance system 106. Configuration data 602 may also include data retention policies. For example, retention policies may include types of data to retain or delete (e.g., based on an age of the data). Retention policies may also include rules for resolving conflicting data. For instance, as new navigation information is received from a vehicle, the retention policies allow the guidance system 106 to determine which data to overwrite. Configuration data 602 may also include a listing of other guidance systems 106 in the network 108 as well as a state of each guidance system 106 (e.g., whether the guidance system 106 is offline or online based on the last data received) and information of where each of the guidance systems 106 is situated. Further, the environment 600 includes navigation data 604, which may be embodied as any data indicative of navigation information received from vehicles, e.g., autonomous vehicles coming within proximity, such as within a specified radius, of the guidance system 106.

The network communicator 620, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from other devices, such as from a vehicle control system 104 in a given vehicle 102. To do so, the network communicator 620 is configured to receive and process data packets from one system or computing device and to prepare and send data packets to another computing device or system. Accordingly, in some embodiments, at least a portion of the functionality of the network communicator 620 may be performed by the communication circuitry 410, and, in the illustrative embodiment, by the NIC 412.

The illustrative communications manager 630, which may be embodied as hardware, firmware, software, virtualized hardware, emulated architecture, and/or a combination thereof as discussed above, is configured to exchange data between autonomous vehicles that the autonomous vehicles may use in navigation across an area associated with the guidance system 106. To do so, the communications manager 630 includes a gather component 632, a data management component 634, and a report component 636.

The gather component 632 is configured to receive data from a vehicle 102 within a specified radius of the guidance system 106. The gather component 632 may transmit a request for navigation data from the vehicle 102 and receive the data. The gather component 632 may also validate the navigation data using a variety of techniques (e.g., an evaluation of credentials of the sending vehicle 102, an integrity check of the data, etc.).

The data management component 634 is to store the data received from the vehicle 102 (e.g., as navigation data 604) in response to the request. Further, the data management component 634 is configured to update the navigation data according to retention policies specified in the configuration data 602. For example, given new data from a vehicle 102, the data management component 634 may apply the retention policies to determine which data to overwrite (e.g., a policy may specify that data relating to traffic conditions should always be overwritten with the same). Further, the data management component 634 may apply a time decaying function to data stored as navigation data 604, such that relatively old data is deleted, weighted less than newer data, and the like.

The report component 636 is configured to transmit the navigation data 604 to a requesting vehicle (e.g., the vehicle 102). Particularly, the report component 636 processes requests received by a vehicle. A request may include a timestamp, an identifier associated with the vehicle 102, an indicator representative of a type of data to receive (e.g., all navigation data, points of interest data only, safety alert data only, etc.), and the like. The report component 636 may retrieve the requested data from storage and transmit the data to the vehicle 102 over a wireless connection.

It should be appreciated that each of the network communicator 620 and components in the communications manager 630 may be separately embodied as hardware, firmware, software, virtualized hardware, emulated architecture, and/or a combination thereof. For example, the network communicator 620 and data management component 634 may be embodied as hardware components, while the gather component 632 and report component 636 are embodied as virtualized hardware components or as some other combination of hardware, firmware, software, virtualized hardware, emulated architecture, and/or a combination thereof.

Figure 7:
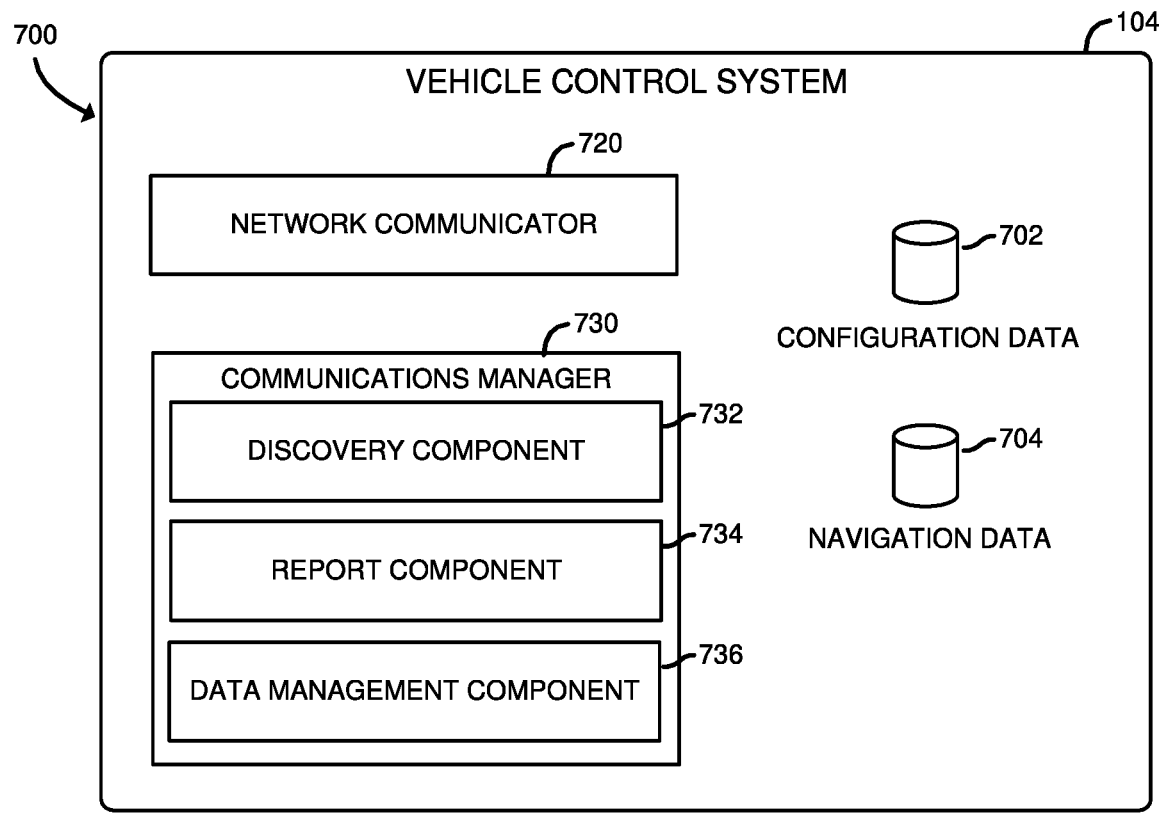
FIG. 7 is a simplified block diagram of at least one embodiment of an environment that may be established by the vehicle control system of FIG. 1.

Referring now to FIG. 7, the vehicle control system 104 may establish an environment 700 in operation. The illustrative environment 700 includes a network communicator 720 and a communications manager 730. Each of the components of the environment 700 may be embodied as hardware, firmware, software, or a combination thereof. Further, in some embodiments, one or more of the components of the environment 700 may be embodied as circuitry or a collection of electrical devices (e.g., network communicator circuitry 720, communications manager circuitry 730, etc.). It should be appreciated that, in such embodiments, one or more of the network communicator circuitry 720 and communication manager circuitry 730 may form a portion of one or more of the NIC 512, compute circuitry 502, the communication circuitry 510, the I/O subsystem 508, data storage devices 514, sensors 516, and/or other components of the vehicle control system 104.

In the illustrative embodiment, the environment 700 includes configuration data 702, which may be embodied as any data relating to configuration parameters for the vehicle control system 104. Configuration data 702 may include an indication of whether the vehicle 102 opts-in to receive navigation data from guidance systems 106. The configuration data 702 may also include credentials associated with the vehicle control system 104 used to authenticate with a given guidance system 106. Configuration data 702 may also include data retention policies. For example, retention policies may include types of data to retain or delete (e.g., based on an age of the data). Retention policies may also include rules for resolving conflicting data. For instance, as new navigation information is received from a guidance system 102, the retention policies allow the vehicle control system 104 to determine which data to overwrite. Configuration data 702 may also include a listing of other guidance systems 106 in the network 108 and information of where each of the guidance systems 106 is situated for a given area. Such data may be included in a map for an on-board navigation system of the vehicle control system 104. Further, the environment 700 includes navigation data 704, which may be embodied as any data indicative of navigation information (as defined in the present disclosure) received from the guidance system 104.

The network communicator 720, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from other devices, such as from a guidance system 106. To do so, the network communicator 720 is configured to receive and process data packets from one system or computing device and to prepare and send data packets to another computing device or system. Accordingly, in some embodiments, at least a portion of the functionality of the network communicator 720 may be performed by the communication circuitry 510, and, in the illustrative embodiment, by the NIC 512.

The illustrative communications manager 730, which may be embodied as hardware, firmware, software, virtualized hardware, emulated architecture, and/or a combination thereof as discussed above, is configured to exchange data with a guidance system 106. To do so, the communications manager 730 includes a discovery component 732, a report component 734, and a data management component 736.

The discovery component 732 is configured to send out a discovery request to a guidance system 106. For example, the discovery component 732 may determine that the vehicle control system 104 is coming into proximity with a guidance system 106 based on a known location of the guidance system 106 in the configuration data. Alternatively (or in addition), the discovery component 732 may detect broadcast signals from a guidance system 106 indicative of an availability thereof. The discovery request is further configured to initiate a connection to be established with the guidance system 106. The discovery component 732 may provide credentials or conduct a communication protocol (e.g., a handshake protocol) to authenticate the vehicle control system 104 with the guidance system 106.

The report component 734 is configured to transmit the navigation data 704 relating to a previous road segment to the guidance system 106. The navigation data 704 that is sent to the guidance system 106 may include a timestamp and credentials associated with the vehicle control system 104. The guidance system 106 in turn may use such information to validate the navigation data 704. The report component 734 is also configured to transmit other data to the guidance system 106, such as messages addressed to other vehicles.

The data management component 736 is to receive navigation data associated with an area covered by the guidance system 106. Further, the data management component 736 is configured to update the stored navigation data 704 according to policies specified in the configuration data 702. For example, given new data from the guidance system 106, the data management component 734 may apply mapping policies to determine which map data to update according to the received navigation data.

It should be appreciated that each of the network communicator 720 and components in the communications manager 730 may be separately embodied as hardware, firmware, software, virtualized hardware, emulated architecture, and/or a combination thereof. For example, the network communicator 730 and data management component 736 may be embodied as hardware components, while the discovery component 732 and report component 734 are embodied as virtualized hardware components or as some other combination of hardware, firmware, software, virtualized hardware, emulated architecture, and/or a combination thereof.

Figure 8:
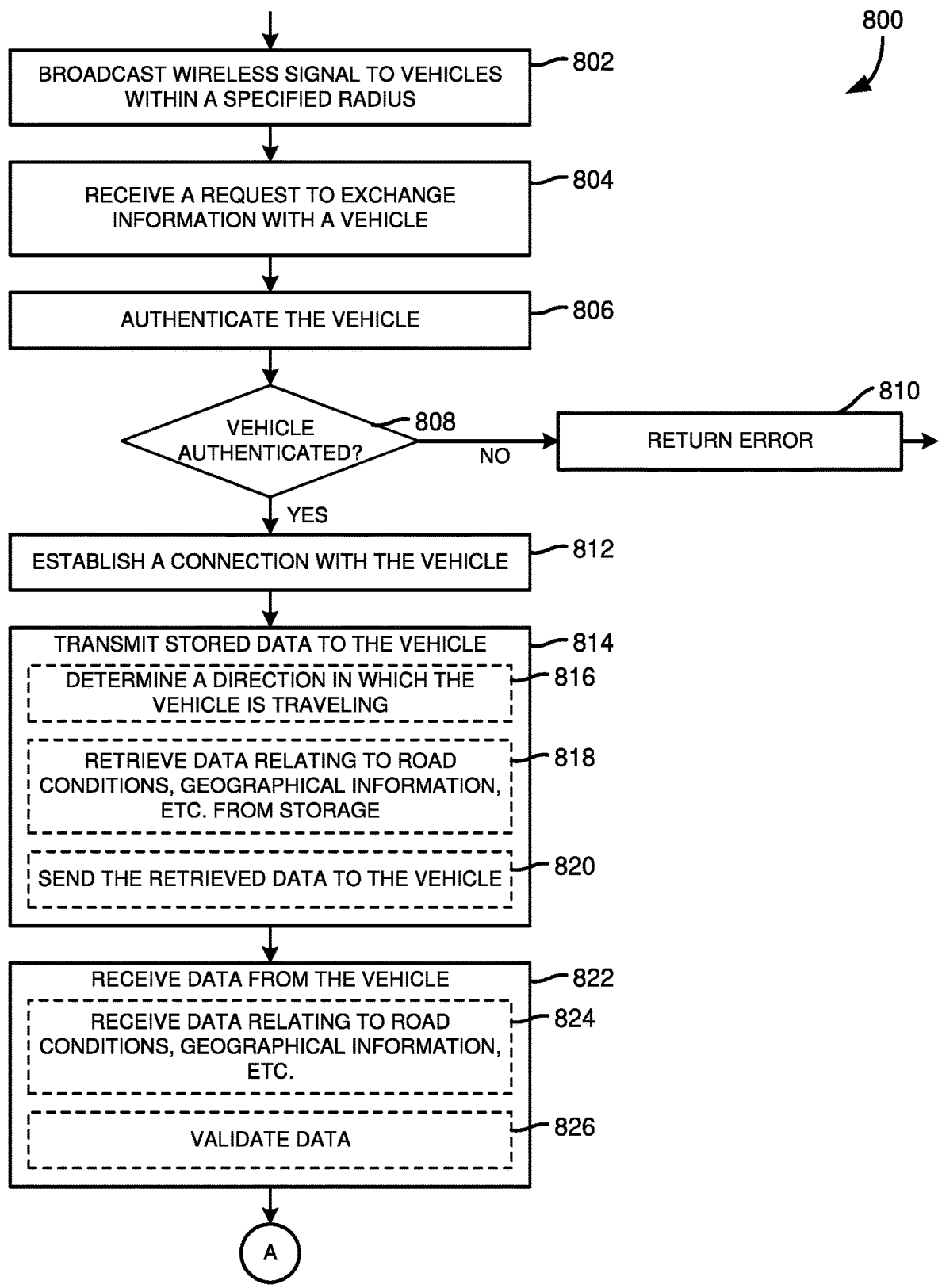
FIGS. 8 and 9 are simplified flow diagrams of at least one embodiment of a method for exchanging data indicative of navigation information between the guidance system of FIG. 1 and an autonomous vehicle.
Figure 9:
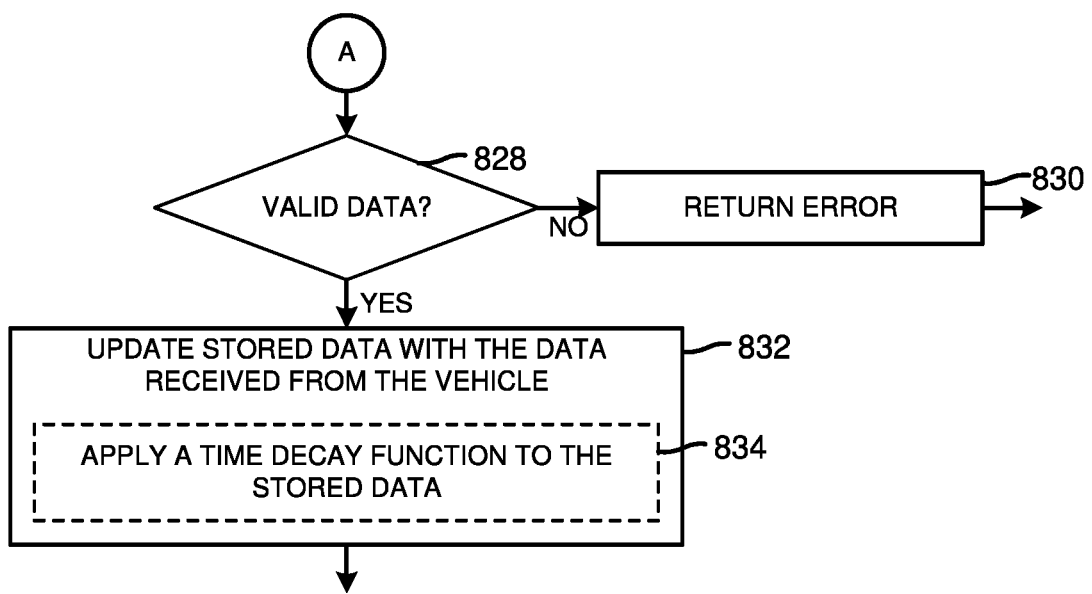

Referring now to FIGS. 8 and 9, each guidance system 106, in operation, may perform a method 800 for exchanging navigation information with an autonomous vehicle, e.g., the vehicle 102. As shown, the method 800 begins in block 802, in which the guidance system 106 broadcasts a wireless signal within a specified radius. The wireless signal may be in a frequency recognizable to autonomous vehicles in proximity. In block 804, the guidance system 106 receives a request to exchange information from a vehicle. For instance, the request may be in response to the vehicle receiving the broadcast signal. In other cases, the request may be from a vehicle that identified the guidance system 106 via a discovery request.

In block 806, the guidance system 106 authenticates the vehicle. The guidance system 106 may do so using a variety of authentication techniques. For example, the guidance system 106 may perform a handshake protocol to initiate a connection. In other cases, the guidance system 106 may request credentials (e.g., a username and a password) from the vehicle 102. In block 808, the guidance system 106 determines whether the authentication was successful. If not, then in block 810, the guidance system 106 may return an error to the requesting vehicle. Otherwise, in block 812, the guidance system 106 establishes a connection with the vehicle. For instance, the guidance system 106 may initiate a wireless connection pairing with the vehicle.

In block 814, the guidance system 106 transmits stored navigation data to the vehicle. For example, in block 816, the guidance system 106 may determine a direction in which the vehicle is traveling, e.g., based on information transmitted by the vehicle itself. In block 818, the guidance system 106 retrieves, from storage, the navigation data. The navigation data may include road conditions, geographical information, signage, and the like. Further, in the event that the guidance system 106 determines a direction of the vehicle, the guidance system 106 retrieves navigation data for a path targeted towards the direction of the vehicle. In block 820, the guidance system 106 sends the retrieved data to the vehicle.

In block 822, the guidance system 106 receives navigation data from the vehicle. The navigation data may be of a previously traversed road segment. For instance, in block 824, the guidance system 106 receives data relating to road conditions and geographical information observed by the vehicle (e.g., through on-board sensors of the vehicle). In block 826, the guidance system 106 may also validate the data. For instance, to do so, the guidance system 106 may perform an integrity check to ensure that a timestamp, sensor data, and an identifier of the vehicle all correlate with one another. In block 828, the guidance system 106 determines whether the data is valid. If not, then in block 830, the guidance system 106 may return an error to the vehicle.

If the data is valid, then in block 832, the guidance system 106 may update the stored data with the new data received from the vehicle. To do so, the guidance system 106 may evaluate one or more data management policies to determine which data to save, overwrite, delete, etc. Further, in block 834, the guidance system 106 may apply a time decay function to the data retained in storage. Doing so allows the guidance system 106 to weight subsequently received navigation based on timeliness (e.g., alerts that are past a certain age may be weighted less or deleted altogether).

Figure 10:
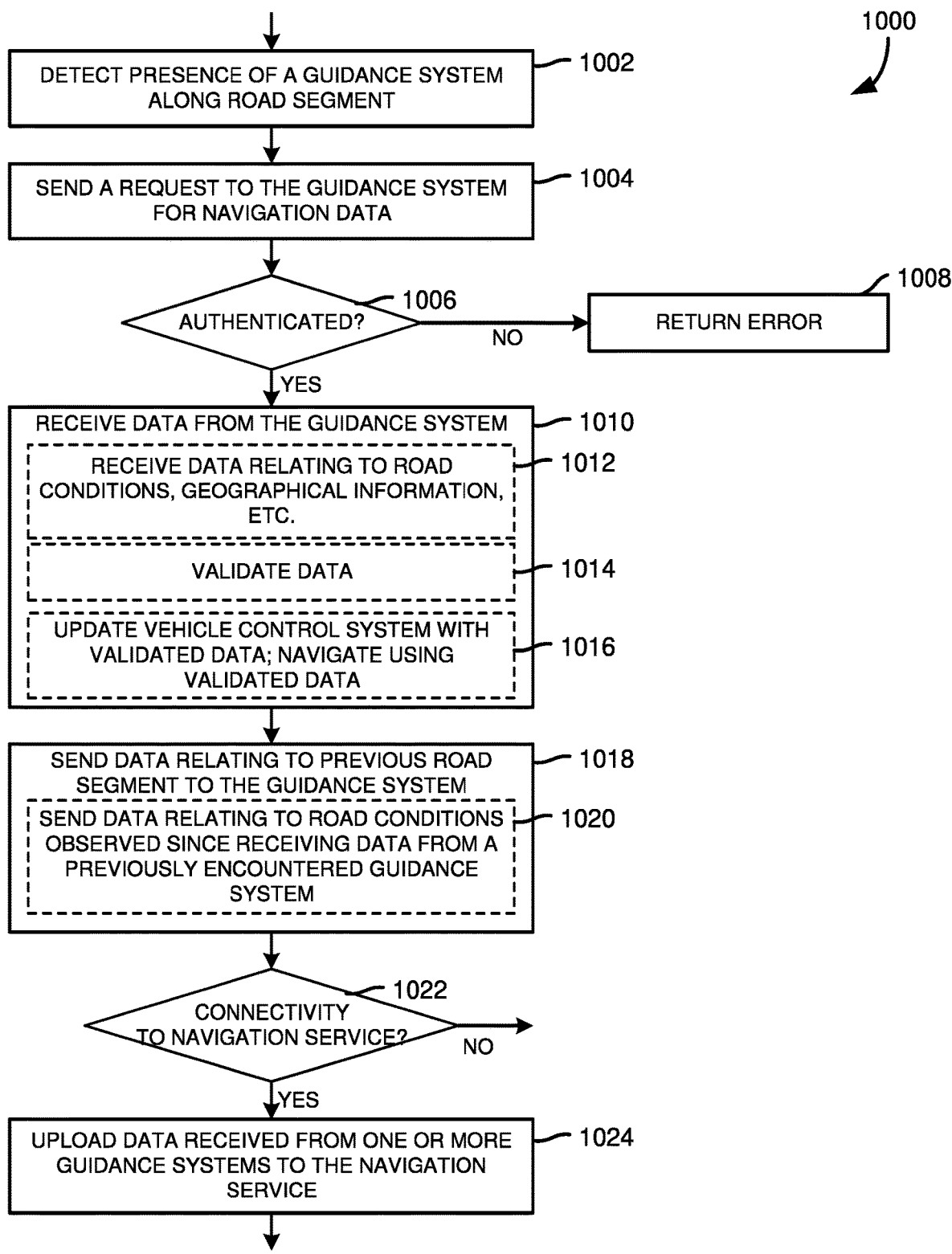
FIG. 10 is a simplified flow diagram of at least one embodiment of a method for exchanging data indicative of navigation information by a vehicle control system and the guidance system of FIG. 1.

Referring now to FIG. 10, the vehicle control system 104, in operation, may perform a method 1000 for exchanging navigation data with a guidance system 106. As shown, the method 1000 begins in block 1002, in which the vehicle control system 104 detects a presence of a guidance system 106 along a road segment. The vehicle control system 104 may do so by receiving a broadcast from the guidance system 106 once in proximity (e.g., within a specified radius of the guidance system 106). The vehicle control system 104 may also do so after sending a discovery request to a guidance system 106 situated at a known location (e.g., based on on-board mapping data in the vehicle control system 104).

In block 1004, the vehicle control system 104 sends a request to the guidance system 106 for navigation data for the area covered by the guidance system 106. In response the guidance system 106 may authenticate the vehicle control system. In block 1006, the vehicle control system 104 determines whether the authentication was successful. For instance, the guidance system 106 may send an indication of the authentication success or failure. If the authentication was not successful, then in block 1008, the vehicle control system 104 may return an error (e.g., displayed on a console of the vehicle 102).

Otherwise, in block 1010, the vehicle control system 104 establishes a connection with the guidance system 106 and receives data from the guidance system 106. For example, in block 1012, the vehicle control system 104 receives data relating to road conditions and geographical information for the area covered by the guidance system 106. In block 1014, the vehicle control system 104 may validate the data based on policies, e.g., whether the data provided by the guidance system 106 is relatively outdated or recent. If valid based on the policy, then in block 1016, the vehicle control system 104 updates its components, such as map and navigation systems, with the validated data. The vehicle control system 104 may navigate the vehicle thereafter with the updated data.

In block 1018, the vehicle control system 104 sends data observed relative to a previous road segment to the guidance system 106. For instance, in block 1020, the vehicle control system 104 sends data relating to road conditions observed since receiving navigation data from a previously encountered guidance system 106.

In block 1022, the vehicle control system 104 determines whether network connectivity is available to the navigation service 112. For instance, the vehicle control system 104 may establish network connectivity when the vehicle is in a more densely populated area. If not, then the method 1000 ends. Otherwise, in block 1024, the vehicle control system 104 uploads data received from one or more guidance systems to the navigation service 112. The navigation service 112 may then propagate new data from the uploaded data to other vehicles.

EXAMPLES

Illustrative examples of the technologies disclosed herein are provided below. An embodiment of the technologies may include any one or more, and any combination of, the examples described below.

Example 1 includes an apparatus, comprising a storage to store data indicative of navigation information within a specified radius of the apparatus; and a compute circuitry to receive, via a wireless connection, a request to exchange the stored data with a vehicle within the specified radius of the apparatus; transmit, via the wireless connection, the stored data to the vehicle; and receive, from the vehicle via the wireless connection, data indicative of navigation information for a path previously passed by the vehicle.

Example 2 includes the subject matter of Example 1, and wherein the compute circuitry is further to store the data indicative of the navigation information for the path previously passed by the vehicle.

Example 3 includes the subject matter of any of Examples 1 and 2, and wherein to transmit the stored data to the vehicle comprises to determine a direction in which the vehicle is traveling; retrieve data indicative of navigation information for the direction in which the vehicle is traveling; and send the data indicative of the navigation information for the direction in which the vehicle is traveling to the vehicle.

Example 4 includes the subject matter of any of Examples 1-3, and wherein to receive the data indicative of the navigation information for a path previously passed by the vehicle comprises to receive data relating to road conditions and geographical information of the path previously passed by the vehicle.

Example 5 includes the subject matter of any of Examples 1-4, and wherein the compute circuitry is further to validate the data received from the vehicle.

Example 6 includes the subject matter of any of Examples 1-5, and wherein the compute circuitry is further to broadcast a wireless signal to a plurality of vehicles within the specified radius of the apparatus.

Example 7 includes the subject matter of any of Examples 1-6, and wherein the compute circuitry is further to initiate an authentication process with the vehicle in response to the broadcast; and in response to a successful authentication, establish a connection with the vehicle.

Example 8 includes the subject matter of any of Examples 1-7, and wherein the compute circuitry is further to receive data from the vehicle addressed to a second vehicle.

Example 9 includes the subject matter of any of Examples 1-8, and wherein the compute circuitry is further to receive a request to exchange the stored data with the second vehicle; send (i) the data addressed to the second vehicle and (ii) the stored data to the second vehicle.

Example 10 includes the subject matter of any of Examples 1-9, and wherein the compute circuitry is further to update the stored data with the data received from the vehicle.

Example 11 includes one or more machine-readable storage media having a plurality of instructions, which, when executed, causes a guidance system to receive, via a wireless connection, a request to exchange data with a vehicle within a specified radius of the guidance system, the data being stored by the guidance system and indicative of navigation information within the specified radius; transmit, via the wireless connection, the stored data to the vehicle; and receive, from the vehicle via the wireless connection, data indicative of navigation information for a path previously passed by the vehicle.

Example 12 includes the subject matter of Example 11, and wherein the plurality of instructions further causes the guidance system to store the data indicative of the navigation information for the path previously passed by the vehicle.

Example 13 includes the subject matter of any of Examples 11 and 12, and wherein to transmit the stored data to the vehicle comprises to determine a direction in which the vehicle is traveling; retrieve data indicative of navigation information for the direction in which the vehicle is traveling; and send the data indicative of the navigation information for the direction in which the vehicle is traveling to the vehicle.

Example 14 includes the subject matter of any of Examples 11-13, and wherein to receive the data indicative of the navigation information for a path previously passed by the vehicle comprises to receive data relating to road conditions and geographical information of the path previously passed by the vehicle.

Example 15 includes the subject matter of any of Examples 11-14, and wherein the plurality of instructions further causes the guidance system to validate the data received from the vehicle.

Example 16 includes the subject matter of any of Examples 11-15, and wherein the plurality of instructions further causes the guidance system to broadcast a wireless signal to a plurality of vehicles within the specified radius of the guidance system.

Example 17 includes the subject matter of any of Examples 11-16, and wherein the plurality of instructions further causes the guidance system to initiate an authentication process with the vehicle in response to the broadcast; and in response to a successful authentication, establish a connection with the vehicle.

Example 18 includes the subject matter of any of Examples 11-17, and wherein the plurality of instructions further causes the guidance system to receive data from the vehicle addressed to a second vehicle.

Example 19 includes the subject matter of any of Examples 11-18, and wherein the plurality of instructions further causes the guidance system to receive a request to exchange the stored data with the second vehicle; send (i) the data addressed to the second vehicle and (ii) the stored data to the second vehicle.

Example 20 includes the subject matter of any of Examples 11-19, and wherein the plurality of instructions further causes the guidance system to update the stored data with the data received from the vehicle.

Example 21 includes a computer-implemented method comprising receiving, via a wireless connection, a request to exchange data with a vehicle within a specified radius of a guidance system, the data being stored by the guidance system and indicative of navigation information within the specified radius; transmitting, via the wireless connection, the stored data to the vehicle; and receiving, from the vehicle via the wireless connection, data indicative of navigation information for a path previously passed by the vehicle.

Example 22 includes the subject matter of Example 21, and further including storing the data indicative of the navigation information for the path previously passed by the vehicle.

Example 23 includes the subject matter of any of Examples 21 and 22, and wherein transmitting the stored data to the vehicle comprises determining a direction in which the vehicle is traveling; retrieving data indicative of navigation information for the direction in which the vehicle is traveling; and sending the data indicative of the navigation information for the direction in which the vehicle is traveling to the vehicle.

Example 24 includes the subject matter of any of Examples 21-23, and wherein receiving the data indicative of the navigation information for a path previously passed by the vehicle comprises receiving data relating to road conditions and geographical information of the path previously passed by the vehicle.

Example 25 includes a guidance system comprising circuitry for receiving, via a wireless connection, a request to exchange data with a vehicle within the specified radius of a guidance system, the data being stored by the guidance system and indicative of navigation information within the specified radius; means for transmitting, via the wireless connection, the stored data to the vehicle; and means for receiving, from the vehicle via the wireless connection, data indicative of navigation information for a path previously passed by the vehicle.

The invention claimed is:

1. An apparatus, comprising:
a storage to store data indicative of navigation information within a specified radius of the apparatus; and
a compute circuitry to:
receive, via a direct wireless connection with a vehicle within the specified radius of the apparatus, a request to exchange the stored data with the vehicle;
transmit, via the direct wireless connection, the stored data to the vehicle; and
receive, from the vehicle via the direct wireless connection, data indicative of navigation information for a path previously passed by the vehicle, wherein the apparatus has no or low network connectivity other than the direct wireless connection with the vehicle when communicating with the vehicle,
wherein the apparatus is part of a system of a plurality of apparatuses to exchange navigation information with the vehicle, wherein the apparatus is to communicate with other apparatuses of the plurality of apparatuses through the vehicle, wherein the plurality of apparatuses are not connected to each other by a network.

2. The apparatus of claim 1, wherein the compute circuitry is further to store the data indicative of the navigation information for the path previously passed by the vehicle.

3. The apparatus of claim 1, wherein to transmit the stored data to the vehicle comprises to:
determine a direction in which the vehicle is traveling;
retrieve data indicative of navigation information for the direction in which the vehicle is traveling; and
send the data indicative of the navigation information for the direction in which the vehicle is traveling to the vehicle.

4. The apparatus of claim 1, wherein to receive the data indicative of the navigation information for a path previously passed by the vehicle comprises to receive data relating to road conditions and geographical information of the path previously passed by the vehicle.

5. The apparatus of claim 1, wherein the compute circuitry is further to validate the data received from the vehicle.

6. The apparatus of claim 1, wherein the compute circuitry is further to broadcast a wireless signal to a plurality of vehicles within the specified radius of the apparatus.

7. The apparatus of claim 6, wherein the compute circuitry is further to:
initiate an authentication process with the vehicle in response to the broadcast; and
in response to a successful authentication, establish a connection with the vehicle.

8. The apparatus of claim 1, wherein the compute circuitry is further to receive data from the vehicle addressed to a second vehicle.

9. The apparatus of claim 8, wherein the compute circuitry is further to:
receive a request to exchange the stored data with the second vehicle;
send (i) the data addressed to the second vehicle and (ii) the stored data to the second vehicle.

10. The apparatus of claim 1, wherein the compute circuitry is further to update the stored data with the data received from the vehicle.

11. The apparatus of claim 1, wherein the apparatus has no network connectivity to a cellular network when communicating with the vehicle.

12. One or more non-transitory machine-readable storage media having a plurality of instructions, which, when executed, causes individual guidance systems of a plurality of guidance systems to:
receive, via a direct wireless connection with a vehicle within a specified radius of the guidance system, a request to exchange data with the vehicle, the data being stored by the guidance system and indicative of navigation information within the specified radius;
transmit, via the direct wireless connection, the stored data to the vehicle;
receive, from the vehicle via the direct wireless connection, data indicative of navigation information for a path previously passed by the vehicle, wherein the guidance system has no or low network connectivity other than the direct wireless connection with the vehicle when communicating with the vehicle; and
communicate with other guidance systems of the plurality of guidance systems through the vehicle, wherein the plurality of guidance systems are not connected to each other by a network.

13. The one or more non-transitory machine-readable storage media of claim 12, wherein the plurality of instructions further causes individual guidance systems of the plurality of guidance systems to store the data indicative of the navigation information for the path previously passed by the vehicle.

14. The one or more non-transitory machine-readable storage media of claim 12, wherein to transmit the stored data to the vehicle comprises to:
determine a direction in which the vehicle is traveling;
retrieve data indicative of navigation information for the direction in which the vehicle is traveling; and
send the data indicative of the navigation information for the direction in which the vehicle is traveling to the vehicle.

15. The one or more non-transitory machine-readable storage media of claim 12, wherein to receive the data indicative of the navigation information for a path previously passed by the vehicle comprises to receive data relating to road conditions and geographical information of the path previously passed by the vehicle.

16. The one or more non-transitory machine-readable storage media of claim 12, wherein the plurality of instructions further causes individual guidance systems of the plurality of guidance systems to broadcast a wireless signal to a plurality of vehicles within the specified radius of the guidance system.

17. The one or more non-transitory machine-readable storage media of claim 16, wherein the plurality of instructions further causes individual guidance systems of the plurality of guidance systems to:
initiate an authentication process with the vehicle in response to the broadcast; and
in response to a successful authentication, establish a connection with the vehicle.

18. The one or more non-transitory machine-readable storage media of claim 12, wherein the plurality of instructions further causes individual guidance systems of the plurality of guidance systems to receive data from the vehicle addressed to a second vehicle.

19. The one or more non-transitory machine-readable storage media of claim 18, wherein the plurality of instructions further causes individual guidance systems of the plurality of guidance systems to:
receive a request to exchange the stored data with the second vehicle;
send (i) the data addressed to the second vehicle and (ii) the stored data to the second vehicle.

20. A computer-implemented method comprising:
receiving, by a guidance system of a plurality of guidance systems and via a direct wireless connection with a vehicle within a specified radius of the guidance system, a request to exchange data with the vehicle, the data being stored by the guidance system and indicative of navigation information within the specified radius;
transmitting, by the guidance system and via the direct wireless connection, the stored data to the vehicle;
receiving, by the guidance system and from the vehicle via the direct wireless connection, data indicative of navigation information for a path previously passed by the vehicle, wherein the guidance system has no or low network connectivity other than the direct wireless connection with the vehicle when communicating with the vehicle; and
communicating, by the guidance system, with other guidance systems of the plurality of guidance systems through the vehicle, wherein the plurality of guidance systems are not connected to each other by a network.

21. The computer-implemented method of claim 20, further comprising storing the data indicative of the navigation information for the path previously passed by the vehicle.

22. The computer-implemented method of claim 20, wherein transmitting the stored data to the vehicle comprises: determining a direction in which the vehicle is traveling; retrieving data indicative of navigation information for the direction in which the vehicle is traveling; and sending the data indicative of the navigation information for the direction in which the vehicle is traveling to the vehicle.

23. The computer-implemented method of claim 20, wherein receiving the data indicative of the navigation information for a path previously passed by the vehicle comprises receiving data relating to road conditions and geographical information of the path previously passed by the vehicle.

24. A guidance system comprising:
circuitry for receiving, via a direct wireless connection with a vehicle within a specified radius of the guidance system, a request to exchange data with the vehicle, the data being stored by the guidance system and indicative of navigation information within the specified radius;
means for transmitting, via the direct wireless connection, the stored data to the vehicle;
means for receiving, from the vehicle via the direct wireless connection, data indicative of navigation information for a path previously passed by the vehicle, wherein the guidance system has no or low network connectivity other than the direct wireless connection with the vehicle when communicating with the vehicle; and
means for communicating, by the guidance system, with other guidance systems of a plurality of guidance systems through the vehicle, wherein the plurality of guidance systems comprises the guidance system, wherein the plurality of guidance systems are not connected to each other by a network.

* * * * *